United States Patent
Koch et al.

(10) Patent No.: US 11,271,390 B2
(45) Date of Patent: Mar. 8, 2022

(54) INTRINSICALLY SAFE CIRCUIT ARRANGEMENT

(71) Applicant: Endress+Hauser Flowtec AG, Reinach (CH)

(72) Inventors: Bernhard Koch, Bad Säckingen (DE); Robert Lalla, Lörrach (DE)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 543 days.

(21) Appl. No.: 16/321,625

(22) PCT Filed: Jun. 26, 2017

(86) PCT No.: PCT/EP2017/065695
§ 371 (c)(1),
(2) Date: Feb. 18, 2019

(87) PCT Pub. No.: WO2018/019503
PCT Pub. Date: Feb. 1, 2018

(65) Prior Publication Data
US 2019/0386486 A1    Dec. 19, 2019

(30) Foreign Application Priority Data
Jul. 29, 2016   (DE) .................... 10 2016 114 032.5

(51) Int. Cl.
*H02H 9/00* (2006.01)
*H02H 1/00* (2006.01)
(52) U.S. Cl.
CPC .......... *H02H 9/008* (2013.01); *H02H 1/0007* (2013.01)
(58) Field of Classification Search
None
See application file for complete search history.

(56) References Cited

U.S. PATENT DOCUMENTS

| 4,438,473 A | 3/1984 | Cawley et al. |
| 4,849,850 A * | 7/1989 | Brahms ............... H04M 19/005 361/101 |

(Continued)

FOREIGN PATENT DOCUMENTS

| CN | 102005916 A | 4/2011 |
| CN | 102695316 A | 9/2012 |

(Continued)

OTHER PUBLICATIONS

Search Report for German Patent Application No. 10 2016 114 032.5, German Patent Office, dated Jul. 24, 2017, 8 pp.

(Continued)

*Primary Examiner* — Stephen W Jackson
(74) *Attorney, Agent, or Firm* — Mark A. Logan; Endress+Hauser(USA) Holding, Inc.

(57) ABSTRACT

An intrinsically safe circuit arrangement for supply of electrical power to a consumer having a maximum power requirement, comprising: a voltage source; a voltage monitor for limiting an output voltage to a maximum value; an electrical current limiting resistor for limiting an output electrical current to a maximum value; and an actively controlled electrical current limiting circuit for limiting output electrical current to an electrical current limit value, wherein the electrical current limiting circuit is embodied such that it controls at least the output current to the electrical current limit value as a function of a voltage drop across a part of the electrical current limiting circuit, when a loading of the circuit arrangement above the nominal load is present, such that an adapting of the electrical current limit value occurs, preferably based on a predetermined characteristic curve.

10 Claims, 5 Drawing Sheets

(56) References Cited

U.S. PATENT DOCUMENTS

| | | | |
|---|---|---|---|
| 6,750,808 B2 * | 6/2004 | Faust | G01F 15/00 342/124 |
| 9,957,942 B2 * | 5/2018 | Sierak | F02N 11/0862 |
| 2003/0161082 A1 | 8/2003 | Rampold et al. | |
| 2008/0100976 A1 | 5/2008 | Huczko et al. | |

FOREIGN PATENT DOCUMENTS

| | | | |
|---|---|---|---|
| CN | 103166439 A | 6/2013 | |
| CN | 104052038 A | 9/2014 | |
| CN | 104378875 A | 2/2015 | |
| DE | 3931537 A1 | 4/1991 | |
| DE | 20010283 U1 | 8/2001 | |
| EP | 2779346 A2 | 9/2014 | |

OTHER PUBLICATIONS

Search Report for International Patent Application No. PCT/EP2017/065695, WIPO, dated Oct. 13, 2017, 11 pp.

* cited by examiner

INTRINSICALLY SAFE CIRCUIT ARRANGEMENT

CROSS-REFERENCE TO RELATED APPLICATIONS

The present application is related to and claims the priority benefit of German Patent Application No. 10 2016 114 032.5, filed on Jul. 29, 2016 and International Patent Application No. PCT/EP2017/065695 filed on Jun. 26, 2017, the entire contents of which are incorporated herein by reference.

TECHNICAL FIELD

The invention relates to an intrinsically safe circuit arrangement for supply of electrical power to a consumer as well as to a system of automation technology, which includes such a circuit arrangement.

BACKGROUND

Field devices of automation technology are applied for registering and/or influencing process variables. Examples of such field devices include fill level measuring devices, mass flow measuring devices, pressure- and temperature measuring devices, pH-redox potential-measuring devices, conductivity measuring devices, etc., which as sensors register the corresponding process variables, fill level, flow, pressure, temperature, pH-value, and conductivity value. Serving for influencing process variables are so-called actuators, e.g. valves, which control the flow of a medium in a pipeline section, or pumps, which change the fill level in a container. Referred to as field devices are, in principle, all devices, which are applied near to the process and which deliver, or process, process relevant information. Thus, in connection with the invention, the terminology, field device, includes all types of measuring devices and actuators. Furthermore, the terminology, field device, also includes e.g. a gateway, a radio adapter or other bus participant integrated/integratable into a bus system.

A large number of such field devices are produced and sold by the group of firms, Endress+Hauser.

Field devices can be connected to circuit arrangements, which serve to supply the field devices with electrical power. In such case, the circuit arrangement can be a part of the field device and be arranged in a field device housing together with other elements of the field device, or the circuit arrangement can be arranged remotely from the field device housing.

In order to use a field device in explosion-endangered regions, strict safety requirements must be followed. These have the goal of preventing a spark formation, which, in given cases, could trigger an explosion, or making sparks non-consequential, in that a spark occurring in the interior of a closed space has no effect on the environment. This goal is attainable in different ways. The corresponding explosion protection measures are divided into ignition protection types, which are regulated in corresponding industrial standards, such as, for example, the standard, IEC 60079, of the International Electrotechnical Commission.

An ignition protection type especially relevant for implementing field devices is called "intrinsic safety (Ex-i)", which is specified in the standard, IEC EN DIN 60079-11. The ignition protection type, "intrinsic safety (Ex-i)", is based on the principle of limiting electrical current- and/or voltage in the electrical circuit of the circuit arrangement for supply of electrical power to a device. In such case, the electrical circuit energy, which could be able to ignite an explosion-endangered atmosphere, is so limited that no sparking or impermissible heating of the electrical components can lead to ignition of a surrounding explosive atmosphere.

Such circuit arrangements are known from the state of the art. Disadvantageous in such case is that, in spite of the energy limiting in the circuit arrangement, in the case of malfunction, for example, in the case of a short circuit at the output, relatively high power losses can still occur in the limiting circuit. Such high power losses are usually expelled in the form of heating of the electrical components.

SUMMARY

Consequently, an object of the invention is to provide an intrinsically safe circuit arrangement, wherein, in the case of malfunction, the power loss is kept as low as possible.

The object of the invention is achieved by an intrinsically safe circuit arrangement for supply of electrical power to a consumer having a maximum power requirement, wherein the circuit arrangement comprises:
  a voltage source;
  a voltage monitor for limiting an output voltage to a maximum output voltage value;
  an electrical current limiting resistor for limiting an output electrical current to a maximum output electrical current value;
  an actively controlled electrical current limiting circuit for limiting output electrical current to an electrical current limit value, wherein the electrical current limiting circuit is embodied in such a manner that it controls at least the output current to the electrical current limit value as a function of a voltage drop across at least one part of the electrical current limiting circuit, when a loading of the circuit arrangement above the nominal load is present, such that an adapting of the electrical current limit value (and thus also of the output electrical current) occurs, preferably based on a predetermined characteristic curve.

According to the invention, a circuit arrangement is provided, which, in the case of malfunction, a maximum power loss arising in the circuit arrangement is held as low as possible by an adapting of electrical current, in order to prevent that an excessive warming, or an excessive thermal loss, occurs.

An advantageous, further development of the circuit arrangement of the invention provides that the electrical current limiting circuit has a predetermined, essentially rectangular, characteristic curve.

Another advantageous, further development of the circuit arrangement of the invention provides that the electrical current limiting circuit has a predetermined, at least sectionally declining, characteristic curve, so that the adapting of the electrical current limit value varies as a function of the voltage drop.

In turn, another advantageous, further development of the circuit arrangement of the invention provides that the electrical current limiting circuit has at least a first shunt resistor, a transistor, a reference voltage source, an operational amplifier and a first control loop, wherein the transistor is connected in series with the first shunt resistor and the first control loop is embodied via the transistor and has a voltage divider in series with a first means, which allows an electrical current to flow only after a certain voltage value is reached, wherein the reference voltage source is arranged before the first shunt resistor and produces a reference voltage, which is applied to a first input of the operational amplifier, wherein a divided voltage of the voltage divider of the first control loop is applied to a second input of the operational amplifier and the first control loop is embodied in such a manner that in the case, in which a voltage drop across the transistor exceeds the certain voltage value of the first means, a control loop electrical current is established, such that the electrical current limiting circuit via the divided voltage of the voltage divider adapts the electrical current limit value.

In turn, another advantageous, further development of the circuit arrangement of the invention provides, additionally, a shunt regulator, which is embodied in such a manner that a current flows through the shunt regulator, when an operating voltage of the shunt regulator is higher than a nominal voltage of the shunt regulator and wherein the electrical current limiting circuit is, furthermore, embodied such that it controls the electrical current limit value as a function of a threshold value established for the current through the shunt regulator. Especially, the further development can provide that the electrical current limiting circuit controls the electrical current limit value in such a manner that the current through the shunt regulator no longer exceeds the threshold value and/or the shunt regulator includes at least a second shunt resistor and a second means for establishing the threshold value, wherein the second shunt resistor and the second means are preferably arranged in series. Additionally, the further development can provide that a resistance value of the second shunt resistor of the shunt regulator is selected in such a manner that the current is 5%, preferably 2.5%, especially preferably 2% of the maximum output electrical current value, when the electrical current limiting circuit controls the electrical current limit value.

In turn, another advantageous, further development of the circuit arrangement of the invention provides that the voltage monitor comprises a crowbar circuit with a thyristor and a melting fuse.

A last advantageous, further development of the circuit arrangement of the invention provides that at least one part of the voltage monitor, the electrical current limiting circuit or the shunt regulator is embodied redundantly, preferably double redundantly, especially preferably triple redundantly.

The object is, moreover, achieved by a system of automation technology, which comprises an intrinsically safe circuit arrangement, which is embodied according to an above described embodiment, and a field device of automation technology, wherein the field device is connected with the intrinsically safe circuit arrangement for electrical power supply.

An advantageous, further development of the system of the invention provides that the field device is arranged in an explosion-endangered region and the circuit arrangement is arranged in a non-explosion-endangered region.

BRIEF DESCRIPTION OF THE DRAWING

The invention will now be explained in greater detail based on the appended drawing, the figures of which show as follows:

FIG. 1 shows a circuit arrangement 1 known from the state of the art for intrinsically safe supply of electrical power. Such includes a voltage source 2, an active voltage monitor, or —limiter 3 as well as an electrical current limiting resistor 5 for limiting an output electrical current to a maximum output electrical current value $I_{max}$, a first connection terminal pair 6 for connecting a connecting line 7 and a second connection terminal pair 8 for connecting a consumer, or load, 9, such as, for example, a field device 9.

Figure 1:
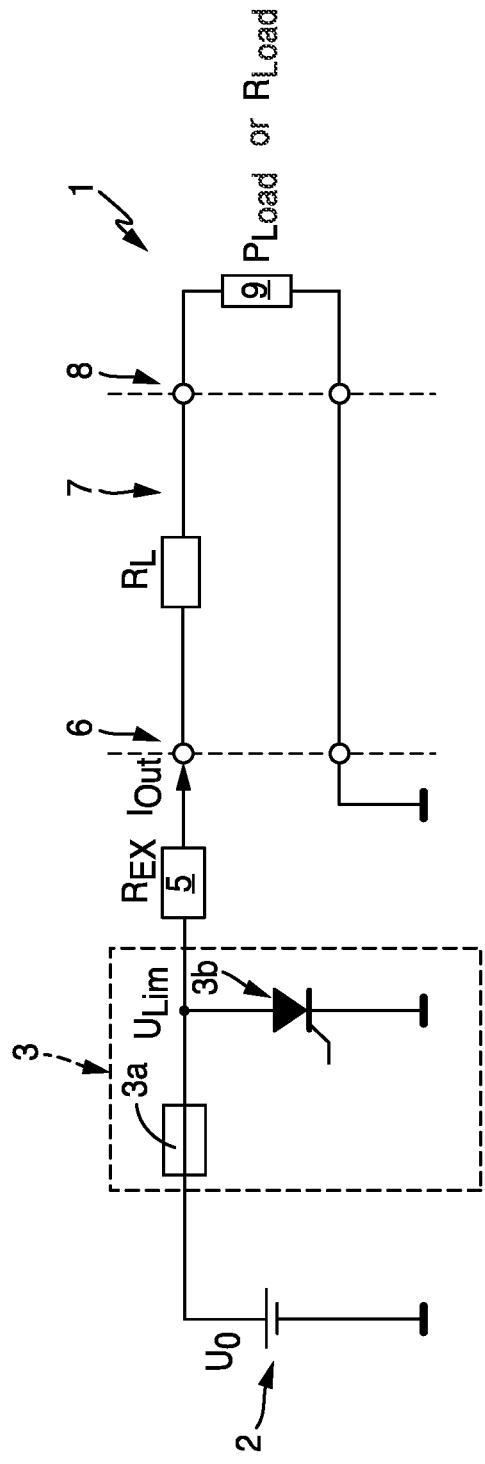
FIG. 1 shows a circuit arrangement known from the state of the art for intrinsically safe supply of electrical power.

In the circuit arrangement illustrated in FIG. 1, there is connected to the voltage source 2 the voltage monitor 3, to which is connected, in turn, the electrical current limiting resistor 5 followed by the first connection terminal pair 6. Connected to the first connection terminal pair 6 is a connecting line 7, which connects the first connection terminal pair 6 with the second connection terminal pair 8, such that the consumer, or load, 9 is connectable to the second connection terminal pair 8.

Voltage monitor 3 is embodied in such a manner that an input voltage $U_0$ of the voltage source 2 does not exceed a value $U_{Lim}$ predefined, or established, by the voltage monitor 3. Typically used as voltage monitor 3 is a crowbar circuit, which is embodied in such a manner that in the case, in which the input voltage $U_0$ exceeds the predefined value $U_{Lim}$, a thyristor 3b is fired, or activated, such that a melting fuse 3a is caused to melt. With loss of electrical continuity by the melting of fuse 3a, the following circuit parts are separated from the voltage source 2.

The electrical current limiting resistor 5 in FIG. 1 is dimensioned with its resistance value $R_{Ex}$ in such a manner that an output current $I_{out}$ on the first connection terminal pair 6 is limited in the case of short circuit to a maximum output electrical current value $I_{max}$ of $$I_{max} = \frac{U_{Lim}}{R_{Ex}}.$$

Such an ohmic resistor is indispensable for intrinsic safety "Ex-i" because of safety-relevant reasons and also correspondingly required in the standard, IEC EN DIN 60079-11.

For correspondingly dimensioned electrical current limiting resistor 5, there results in the case of short circuit at the first connection terminal pair 6 a maximum power loss $P_{Vmax}$ of $$P_{Vmax} = \frac{U_{Lim}^2}{R_{Ex}}.$$

The consumer, or load, 9, which is connected to the second connection terminal pair 8 via the connecting line 7 with a maximum line resistance $R_L$, is thus provided a maximum effective power $P_{max}$ of, at most, $$P_{max} = \frac{U_0^2}{4 \cdot (R_{Ex} + R_L)}.$$

This means that in the worst case the power loss in the circuit arrangement, depending on line resistance $R_L$, is higher than the effective power for the consumer 9 at least by a factor of 4.

Figure 2:
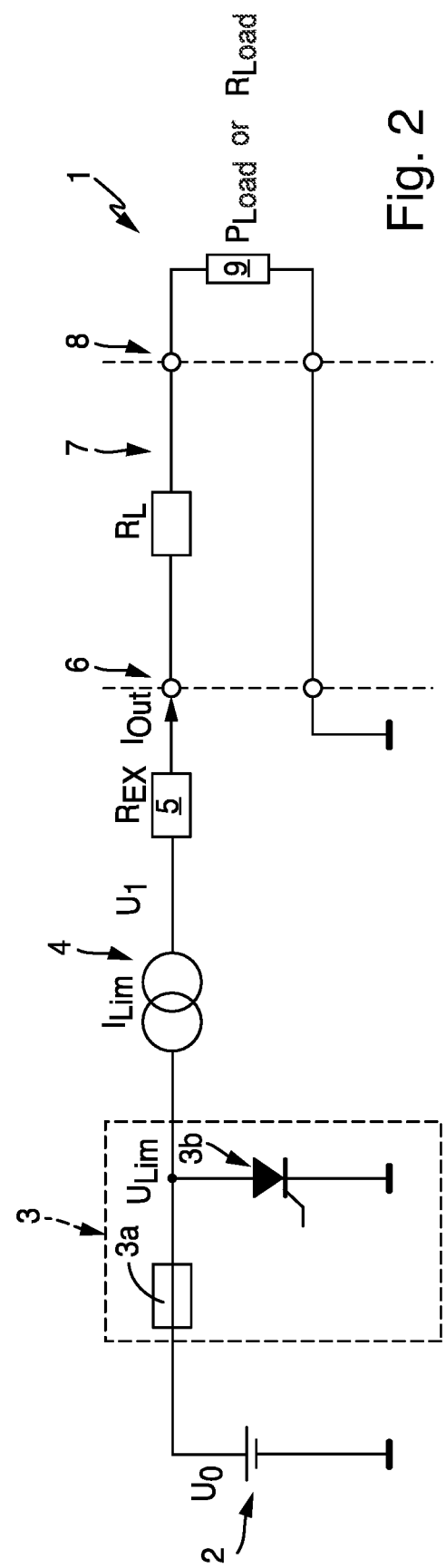
FIG. 2 shows a circuit arrangement improved as regards the ratio of power loss to effective power.

FIG. 2 shows an intrinsically safe circuit arrangement 1 improved as regards the ratio of power loss to effective power compared with the circuit arrangement illustrated in FIG. 1. For this, supplementally to the components illustrated in FIG. 1, an electronic electrical current limiting circuit 4 is arranged between the voltage monitor 3 and the output resistance for limiting output electrical current. The electrical current limiting circuit 4 limits the output current $I_{out}$ to a maximum electrical current limit value $I_{Lim, max}$ of $$I_{Lim,max} = \frac{U_0}{2 \cdot (R_{Ex} + R_L)}.$$

Figure 3:
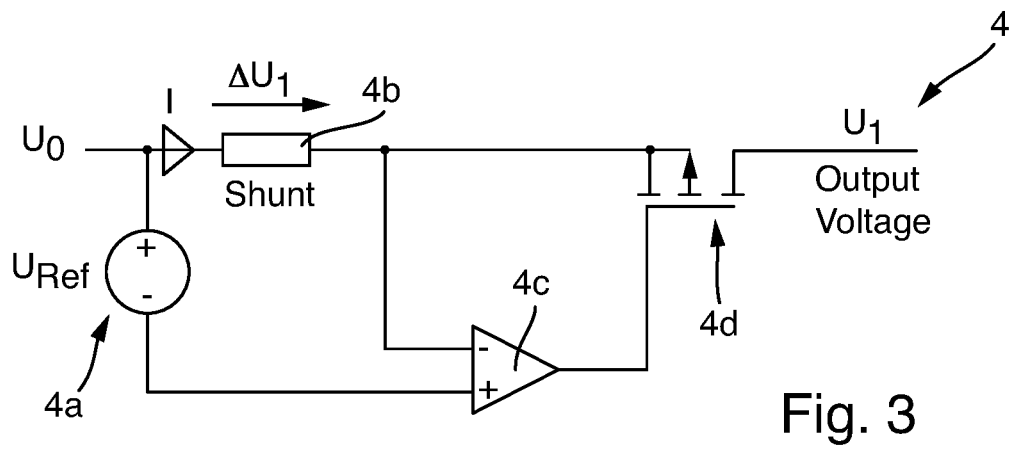
FIG. 3 shows by way of example, an actively controlled electrical current limiting circuit in more detail.

FIG. 3 shows, by way of example, an actively controlled electrical current limiting circuit in more detail. Such includes a first shunt resistor 4b, a reference voltage source 4a, an operational amplifier 4c and a transistor 4d, for example, a field effect transistor, preferably a p-channel, field effect transistor. The electrical current limiting circuit 4 is equipped in such a manner that in the case, in which a voltage drop $\Delta U_1$ across the shunt resistor 4b is significantly lower than a reference voltage $U_{Ref}$ produced by the reference voltage source 4a, the output of the operational amplifier 4c goes negative, so that the p-channel, field effect transistor connected to the operational amplifier becomes conductive and in the case, in which the voltage drop across the shunt resistor essentially equals or is greater than the reference voltage $U_{Ref}$, the output of the operational amplifier goes positive, so that the field effect transistor becomes nonconductive.

In this way, the output current $I_{out}$ of the circuit arrangement illustrated in FIG. 2 is limited to an essentially rectangular, characteristic curve.

Figure 4:
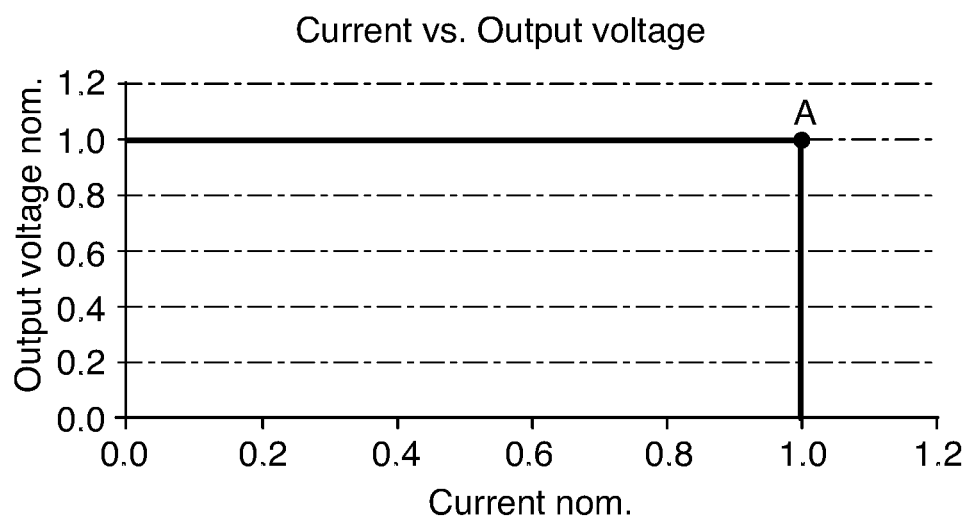
FIG. 4 shows a rectangular, characteristic curve, on which the active electrical current limiting circuit is based.

FIG. 4 shows such a rectangular, characteristic curve, which is characteristic for the electrical current limiting circuit shown in FIG. 3.

By way of example, the behavior of the circuit arrangement illustrated in FIG. 2 with an actively controlled electrical current limiting circuit of FIG. 3 is explained by two cases, one, that no limiting is present and the other, that a limiting is present as a result of the electrical current limiting circuit 4.

In the case, in which no limiting is present, the voltage $U_1$ essentially equals the input voltage $U_0$ (point A in FIG. 4). Thus, essentially no voltage is lost via the electrical current limiting circuit 4. Under the assumption that the circuit arrangement is optimally adapted for the consumer with a nominal load $R_{load}$, i.e. in the power-matched case ($R_{Ex}+R_L=R_{load}$), there results a maximum effective power $P_{max}$ of $$P_{max} = \frac{U_0^2}{4 \cdot (R_{Ex} + R_L)}.$$

In the case, in which a limiting is present (left of the point A in FIG. 4), the voltage $U_1$ deviates from the input voltage $U_0$, so that a voltage drop $\Delta U_1$ occurs across the electrical current limiting circuit 4.

Such an electrical current limiting circuit 4 does not change the maximum observable effective power $P_{max}$ compared with the circuit arrangement of FIG. 1. However, the maximum power loss in the current limiting circuit 4 is reduced to $$P_V = I_{Lim} \cdot U_{Lim} = \frac{U_0 \cdot U_{Lim}}{2 \cdot (R_{Ex} + R_L)}.$$

This leads to ratio of power loss to effective power improved by a factor of 2. In spite of this, the ratio is, however, still always at least twice as high as the effective power.

Figure 5:
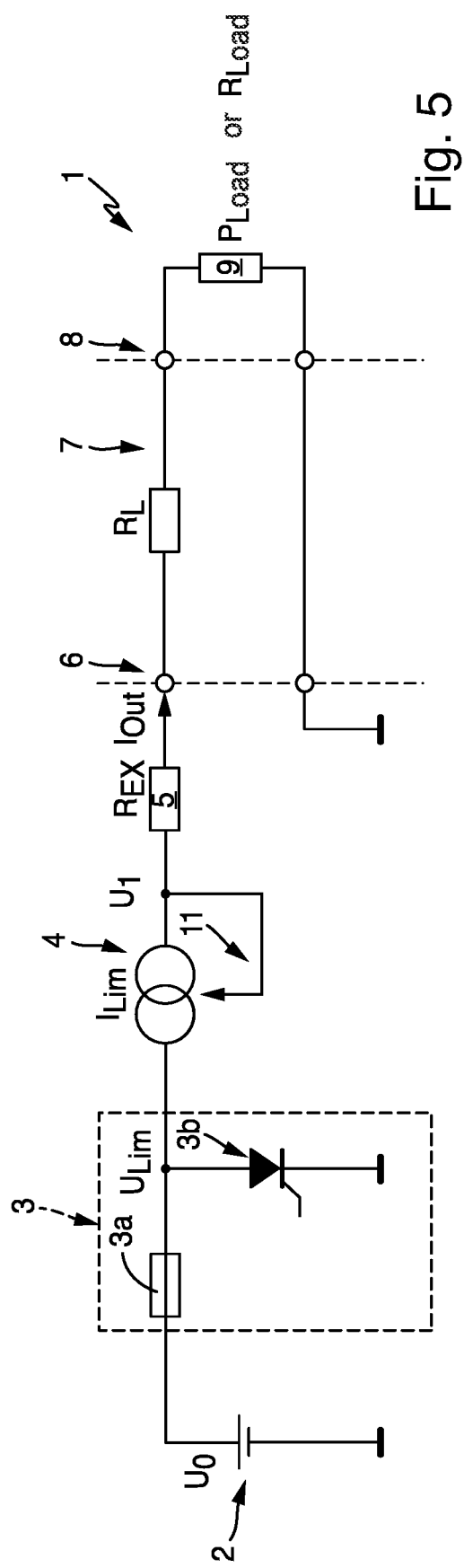
FIG. 5 shows a circuit arrangement further improved as regards the ratio of power loss to effective power compared with the circuit arrangement illustrated in FIG. 2.

FIG. 5 shows a circuit arrangement further improved as regards the ratio of power loss to effective power. This is achieved by replacing the active electrical current limiting circuit 4 having a rectangular, characteristic curve with an electrical current limiting circuit having a declining, characteristic curve. For this, the electrical current limiting circuit 4 includes, same as the electrical current limiting circuit 4 shown in FIG. 3, again a first shunt resistor 4b, a transistor 4d, a reference voltage source 4a, an operational amplifier 4c and, supplementally, a first control loop 11.

This measure does not change the maximum electrical current limit value $I_{Lim,max}$ compared with the circuit arrangement of FIG. 2, which is still $$I_{Lim,max} = \frac{U_0}{2 \cdot (R_{Ex} + R_L)}.$$

However, the maximum power loss $P_V$ in the circuit arrangement of FIG. 5 falls as a function of a declining, characteristic curve $$P_V = P_{V(current\ limiting)} + P_{V(current\ limiting\ resistor)}$$
$$= (U_{Lim} - U_1) \cdot I_{Lim(U1)} + I_{Lim(U1)}^2 \cdot R_{Ex},$$

wherein $P_{V(current\ limiting)}$ is the power loss of the electrical current limiting circuit and $P_{V(current\ limiting\ resistor)}$ is the power loss of the electrical current limiting resistor.

Considered simplified, the maximum power loss in the circuit arrangement results in the case, in which the voltage drop ($U_{Lim}-U_1$) across the electrical current limiting circuit is essentially zero, so that a theoretical maximum value for the power loss is $$P_V = I_{Lim}^2 \cdot R_{Ex}$$

Using this idea, the theoretical power loss can be expressed as $$P_V = \frac{U_0^2}{2 \cdot (R_{Ex} + R_L)} \cdot \frac{R_{Ex}}{2 \cdot (R_{Ex} + R_L)}$$

Under the assumption that the line resistance $R_L$ is negligibly small compared with the electrical current limiting resistor $R_{Ex}$, there results $$P_V = \frac{1}{2}\frac{U_0^2}{2\cdot(R_{Ex}+R_L)}$$

This means that the theoretically maximum possible power loss equals the effective power withdrawable at the second connection terminal pair.

Figure 6:
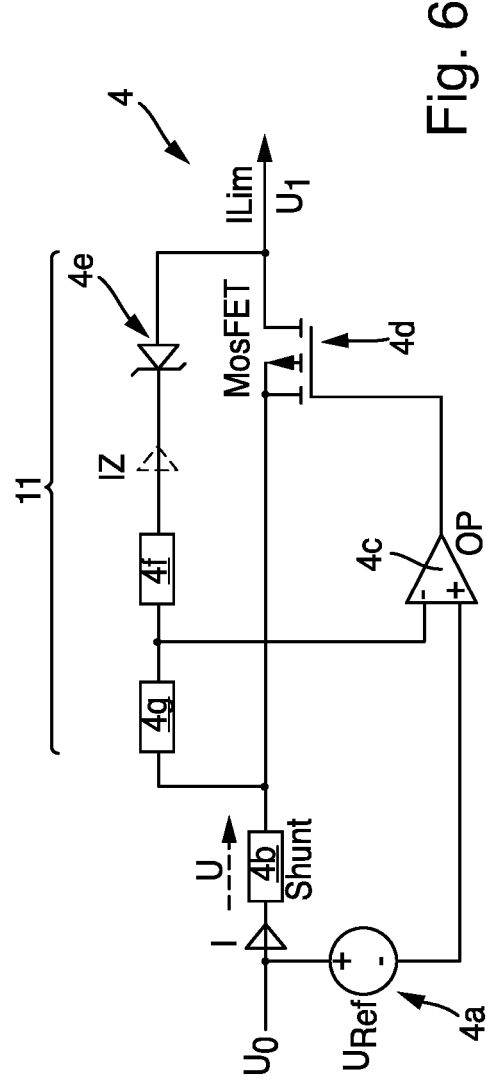
FIG. 6 shows by way of example, an electrical current limiting circuit based on a declining, characteristic curve.

FIG. 6 shows, by way of example, a current limiter having a declining, characteristic curve. Such includes, supplementally to the components illustrated in FIG. 3, a first control loop 11.

The first control loop 11 includes a voltage divider 4f, 4g and a first means 4e, which allows a control loop electrical current $I_z$ to flow only after reaching a certain voltage value. In the case, in which the certain voltage value is applied to the first means 4e, or this voltage value is exceeded, a control loop electrical current $I_z$ flows, so that a divided voltage occurs in the voltage divider. This divided voltage is fed to a second input of the operational amplifier 4c. Fed to the first input of the operational amplifier as also in the example illustrated in FIG. 3, is a reference voltage $U_{Ref}$ of the reference voltage source 4a, so that the operational amplifier 4c controls a following field effect transistor.

In the example illustrated in FIG. 6, the first means is implemented in the form of a Zener diode, which is connected in series with the voltage divider composed of two resistors. The anode of the Zener diode 4e is connected, in such case, with the source of the field effect transistor 4d and its cathode is connected with the voltage divider 4f, 4g, wherein the divided voltage of the voltage divider 4f, 4g is led to the operational amplifier 4c. Thus, there flows in the case, in which the source-drain voltage of the field effect transistor 4d exceeds the Zener voltage, a control loop electrical current $I_z$, which produces a voltage drop across the voltage divider 4f, 4g and the divided voltage controls the operational amplifier 4c in such a manner that with increasing voltage drop the electrical current is reduced to the electrical current limit value $I_{Lim}$. The first means 4e is, however, not limited to a Zener diode, but, instead, can be, for example, also two series connected diodes or the like.

Figure 7:
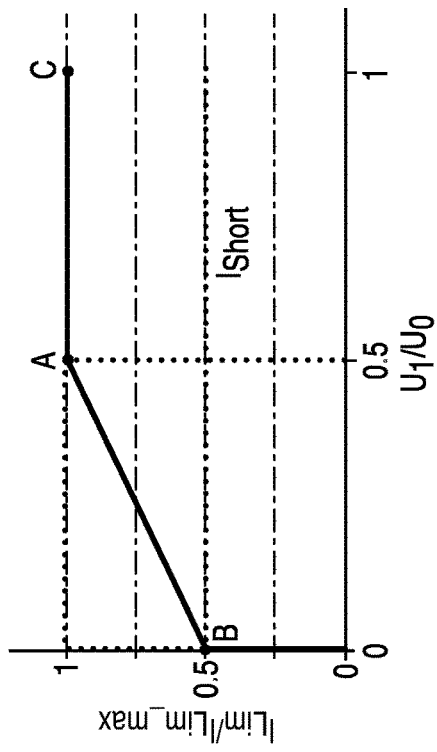
FIG. 7 shows a declining, characteristic curve, on which the active electrical current limiting is based.

FIG. 7 shows an idealized declining, characteristic curve, which can occur in the above described active electrical current limiting circuit 4. In such case, the points "A" and "B" represent for the electrical current limiting circuit 4 characteristic points, which, depending on concrete embodiment of the electrical current limiting circuit 4, i.e. dimensioning of the components, are variably adjustable. Thus, point "A" establishes the voltage value (in FIG. 7, at $U_1 = 0.5 \cdot U_0$), after which the electrical current $I_{Lim}$ is limited by the electrical current limiting circuit. In contrast, point "B" establishes the maximum electrical current in the case of short circuit. In FIG. 7, the maximum electrical current $I_{Lim}$ controlled to by the electrical current limiting circuit 4 in the case of short circuit is equal to half of the maximum possible electrical current limit value $I_{Lim,max}$.

Figure 8:
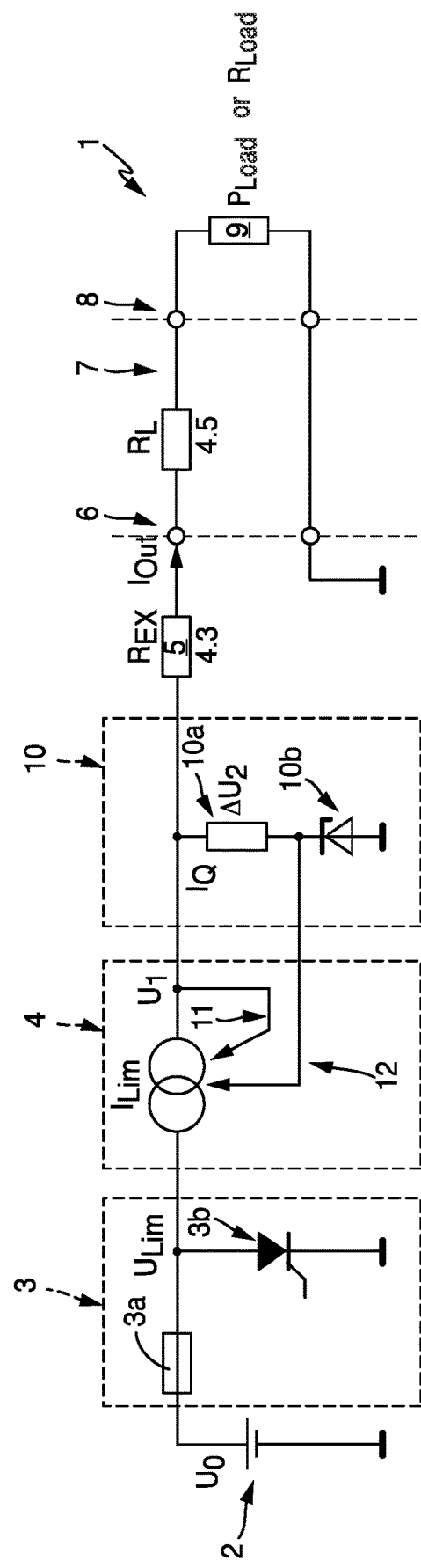
FIG. 8 shows an intrinsically safe circuit arrangement, which compared with the circuit arrangement illustrated in FIG. 5, has improved properties as regards the stabilizing of the output voltage.

FIG. 8 shows an intrinsically safe circuit arrangement similar to that shown in FIG. 5 and having improved properties as regards the stabilizing of the output voltage. In the case of the circuit arrangement illustrated in FIG. 5, the predefined, or set value $U_{Lim}$ of the voltage monitor 3 must because of tolerances be selected significantly higher than the output voltage desired for operation of the circuit arrangement. In order to be able to bring the output voltage desired on the first connection terminal pair 6 nearer to the predefined, or established, value $U_{Lim}$ of the voltage monitor, the circuit is expanded to include a shunt regulator, or voltage controller, 10.

The shunt regulator 10 includes a resistor 10a and a series arranged, second means 10b for establishing a threshold value, or nominal voltage. The second means 10b can be, for example, a second Zener diode, whose Zener voltage serves as threshold value. Alternatively, the second means can, however, also be embodied in the form of a field effect transistor. The shunt regulator 10 is arranged with its resistor connected between the electrical current limiting circuit and the output resistor $R_{Ex}$. A current $I_Q$ flows through resistor 10a and second means 10b. The resistance value of the resistor is selected as small as possible, so that the current $I_Q$ is typically significantly less than 5% of the maximum electrical current limit value $I_{Lim, max}$, which is again, such as already mentioned, $$I_{Lim,max} = \frac{U_0}{2\cdot(R_{Ex}+R_L)}.$$

For example, the resistance value can be less than 5 ohm, preferably less than 3 ohm, especially preferably less than 1 ohm.

The shunt regulator 10 provides that in the case, in which it is active, i.e. when an operating voltage is higher than a nominal voltage of the shunt regulator, for example, a nominal voltage provided by the Zener voltage of the second Zener diode, electrical current $I_Q$ flows through the shunt regulator. Due to the current $I_Q$, a loading of the electrical current limiting circuit takes place. In order to reduce the power loss in the active case of the shunt regulator 10, the current $I_Q$ is measured via a voltage drop $\Delta U_2$ across the resistor and, via a second control loop 12, the electrical current limiting circuit is controlled in such a manner that, in the case of exceeding a threshold value established for the current $I_Q$, the electrical current limit value $I_{Lim}$ is lowered until the current $I_Q$ through the shunt regulator 10 no longer exceeds the threshold value, so that the power loss caused by the shunt regulator 10 is minimized.

In the case, in which the shunt regulator 10 is not active, i.e. when the operating voltage is lower than the nominal voltage, or Zener voltage of the Zener diode, the electrical current limiting circuit functions same as in the case of the circuit arrangement illustrated in FIG. 5. This means that in the case of a loading of the circuit arrangement below or equal to the nominal load, the shunt regulator 10 does not actively control the output current and thus there is only a negligible voltage drop $\Delta U_2$. In the case, in which an exceeding of the nominal load is present, for example, because of a short circuit, the electrical current limiting circuit 4 reduces the electrical current limit value as a function of the voltage drop across the electrical current limiting circuit in accordance with a defined characteristic curve.

The circuit arrangements illustrated in FIGS. 2 to 8 are simply embodied. It can, however, also be provided that at least one part of the voltage monitor 3, the electrical current limiting circuit 4 or the shunt regulator is embodied redundantly. In such case, the redundant elements can be embodied both double as well as also triple redundantly.

Figure 9:
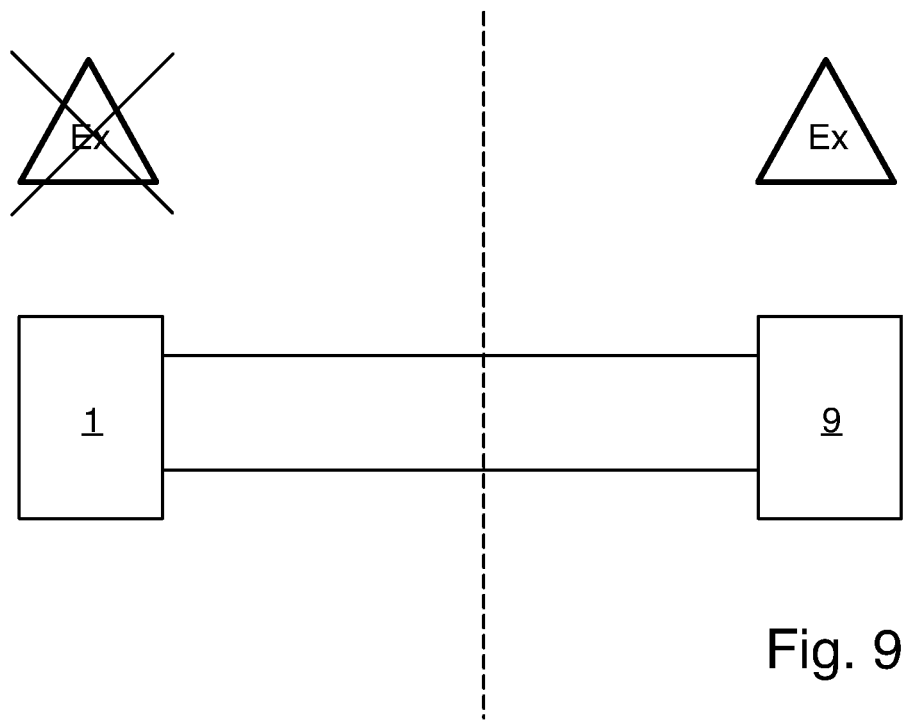
FIG. 9 shows a system of automation technology comprising an intrinsically safe circuit arrangement and a field device, which receives electrical power from the circuit arrangement.

FIG. 9 represents a system of automation technology 13 comprising an intrinsically safe circuit arrangement 1 and a field device 9, which is supplied with power by the circuit arrangement 1. In such case, the intrinsically safe circuit arrangement 1 is embodied such as described above. The intrinsically safe circuit arrangement 1 sits, in such case, in a non-explosion-endangered region, while, in contrast, the field device 9 is located in an explosion-endangered region and is supplied with energy by the circuit arrangement 1.

The invention claimed is:

1. An intrinsically safe circuit for supply of electrical power to a consumer having a maximum power requirement, comprising:
    a voltage source;
    a voltage monitor for limiting an output voltage to a maximum output voltage value;
    an current limiting resistor for limiting an output current to a maximum output electrical current value; and
    an actively controlled current limiting circuit including a first shunt resistor, a transistor, a reference voltage source, an operational amplifier, and a first control loop,
        wherein the transistor is connected in series with the first shunt resistor and the first control loop is embodied via the transistor and includes a voltage divider in series with a first means configured to allow an electrical current to flow only after a certain voltage value is reached,
        wherein the reference voltage source is arranged before the first shunt resistor and is configured to produce a reference voltage that is applied to a first input of the operational amplifier,
        wherein a divided voltage of the voltage divider of the first control loop is applied to a second input of the operational amplifier, and
        wherein the first control loop is embodied such that when a voltage drop across the transistor exceeds the certain voltage value of the first means a control loop current is established such that the current limiting circuit via the divided voltage of the voltage divider adapts the current limit value, and
    wherein the actively controlled limiting circuit is embodied to limit the output current to a current limit value as a function of a voltage drop across at least one part of the current limiting circuit when the intrinsically safe circuit is loaded above a nominal load, wherein the limiting of the output current to the electrical current limit value is based on a predetermined characteristic curve.

2. The intrinsically safe circuit as claimed in claim 1, wherein the predetermined characteristic curve is essentially rectangular.

3. The intrinsically safe circuit as claimed in claim 1, wherein the predetermined characteristic curve is at least sectionally declining such that the limiting of the output current varies as a function of the voltage drop.

4. An intrinsically safe circuit for supply of electrical power to a consumer having a maximum power requirement, comprising:
    a voltage source;
    a voltage monitor for limiting an output voltage to a maximum output voltage value;
    an current limiting resistor for limiting an output current to a maximum output electrical current value;
    an actively controlled current limiting circuit embodied to limit the output current to a current limit value as a function of a voltage drop across at least one part of the current limiting circuit when the intrinsically safe circuit is loaded above a nominal load, wherein the limiting of the output current to the electrical current limit value is based on a predetermined characteristic curve; and
    a shunt regulator embodied such that a current flows through the shunt regulator when an operating voltage of the shunt regulator is higher than a nominal voltage of the shunt regulator, wherein the current limiting circuit is, furthermore, embodied to control the current limit value as a function of a threshold value established for the current through the shunt regulator.

5. The intrinsically safe circuit as claimed in claim 4, wherein the current limiting circuit is configured to control the current limit value such that the current through the shunt regulator does not exceed the threshold value.

6. The intrinsically safe circuit as claimed in claim 5, wherein the shunt regulator includes a second shunt resistor and a second means configured to establish the threshold value, wherein the second shunt resistor and the second means are arranged in series.

7. The intrinsically safe circuit as claimed in claim 6, wherein a resistance value of the second shunt resistor of the shunt regulator is selected such that the current through the shunt regulator is less than 5% of the maximum output current value, when the current limiting circuit controls the current limit value.

8. The intrinsically safe circuit as claimed in claim 4, wherein at least one of the voltage monitor, the current limiting circuit and the shunt regulator is embodied redundantly.

9. A system of automation technology, comprising:
    an intrinsically safe circuit, including:
        a voltage source;
        a voltage monitor for limiting an output voltage to a maximum output voltage value;
        an current limiting resistor for limiting an output current to a maximum output electrical current value; and
        an actively controlled current limiting circuit embodied to limit the output current to a current limit value as a function of a voltage drop across at least one part of the current limiting circuit when the intrinsically safe circuit is loaded above a nominal load, wherein the limiting of the output current to the electrical current limit value is based on a predetermined characteristic curve; and
    a field device of automation technology, wherein the field device is connected with the intrinsically safe circuit for electrical power supply and the field device is arranged in an explosion-endangered region and the intrinsically safe circuit is arranged in a non-explosion-endangered region.

10. An intrinsically safe circuit for supply of electrical power to a consumer having a maximum power requirement, comprising:
    a voltage source;
    a voltage monitor for limiting an output voltage to a maximum output voltage value, wherein the voltage monitor includes a crowbar circuit with a thyristor and a melting fuse;
    an current limiting resistor for limiting an output current to a maximum output electrical current value; and an actively controlled current limiting circuit embodied to limit the output current to a current limit value as a function of a voltage drop across at least one part of the current limiting circuit when the intrinsically safe circuit is loaded above a nominal load, wherein the limiting of the output current to the electrical current limit value is based on a predetermined characteristic curve.

* * * * *